United States Patent [19]

Kawano et al.

[11] Patent Number: 5,659,683
[45] Date of Patent: Aug. 19, 1997

[54] DISTRIBUTED COMPUTER SYSTEM AND METHOD USING A COMMON TRANSMISSION LINE IN A PLURALITY OF PROCESSORS INTERCONNETED FOR EXECUTING A PROGRAM MODULE UTILIZING ATTRIBUTES

[75] Inventors: Katsumi Kawano, Kawasaki; Kinji Mori, Machida; Hirokazu Kasashima, Hitachi; Keiji Oshima, Hitachinaka, all of Japan

[73] Assignee: Hitachi, Ltd., Tokyo, Japan

[21] Appl. No.: 359,584

[22] Filed: Dec. 20, 1994

[30] Foreign Application Priority Data

Dec. 27, 1993 [JP] Japan ................................. 5-330499

[51] Int. Cl.$^6$ ............................................ G06F 15/16
[52] U.S. Cl. .......................... 395/610; 395/712; 395/553; 395/200.54; 364/550
[58] Field of Search ............................ 371/19; 395/650, 395/800, 704, 200.03, 200.12, 200.21, 185.1, 671, 703, 553, 712, 450; 370/85.6; 364/200

[56] References Cited

U.S. PATENT DOCUMENTS

| | | | |
|---|---|---|---|
| 4,366,479 | 12/1982 | Mori et al. | 340/825.05 |
| 4,394,725 | 7/1983 | Bienvenu et al. | 364/200 |
| 4,785,397 | 11/1988 | Koizumi et al. | 395/712 |
| 4,803,683 | 2/1989 | Mori et al. | 371/19 |
| 4,831,512 | 5/1989 | Nakai et al. | 395/200.21 |
| 4,837,762 | 6/1989 | Wachi et al. | 370/450 |
| 4,888,683 | 12/1989 | Koizumi et al. | 395/712 |
| 4,953,096 | 8/1990 | Wachi et al. | 364/550 |
| 5,131,084 | 7/1992 | Kasashima et al. | 395/553 |
| 5,287,537 | 2/1994 | Newmark et al. | 395/800 |
| 5,313,632 | 5/1994 | Sekizawa et al. | 395/671 |
| 5,317,568 | 5/1994 | Bixby et al. | 370/85.6 |
| 5,335,324 | 8/1994 | Orima et al. | 395/200.03 |
| 5,377,322 | 12/1994 | Ogura et al. | 395/185.1 |
| 5,410,651 | 4/1995 | Sekizawa et al. | 395/200.03 |
| 5,425,028 | 6/1995 | Britton et al. | 370/389 |
| 5,442,771 | 8/1995 | Filepp et al. | 395/650 |
| 5,471,615 | 11/1995 | Amatsu et al. | 395/200.15 |
| 5,485,579 | 1/1996 | Hitz et al. | 395/200.12 |
| 5,506,962 | 4/1996 | Orima et al. | 395/200.03 |
| 5,511,167 | 4/1996 | Kawano et al. | 395/200.03 |
| 5,517,656 | 5/1996 | Shi | 395/800 |
| 5,524,253 | 6/1996 | Pham et al. | 395/800 |
| 5,561,802 | 10/1996 | Orima et al. | 395/704 |

FOREIGN PATENT DOCUMENTS 56-111353  9/1981  Japan.

Primary Examiner—Thomas G. Black
Assistant Examiner—Charles Rones
Attorney, Agent, or Firm—Fay, Sharpe, Beall, Fagan, Minnich & McKee

[57] ABSTRACT

A management table is provided in each processor so as to manage the quality of data which is transferred via a common transmission medium which is connected to the processors, and when each processor sends data, it refers to the management table and sends the data to the common transmission medium by adding the attribute information indicating the quality of the data to it, and when each processor receives data, it refers to the management table and decides whether or not to let the program module receive the data on the basis of the attribute information added to the data, so that the flow of information in a distributed system can be managed autonomously for each attribute thereof, and information of an attribute is prevented from flowing into a specific group, and a plurality of attribute informations are integrated to one, and the protection of attributes among different kinds of applications and the connection processing are available.

21 Claims, 12 Drawing Sheets

FIG. 9

| PROGRAM MODULE NAME | SENDING MANAGEMENT INFORMATION ||||| RECEIVING MANAGEMENT INFORMATION |||||
| --- | --- | --- | --- | --- | --- | --- | --- | --- | --- | --- |
| | SENDING MANAGEMENT AREA 1 || ••• | SENDING MANAGEMENT AREA N || RECEIVING MANAGEMENT AREA 1 || ••• | RECEIVING MANAGEMENT AREA M ||
| | SENDING CC | INFORMATION ATTRIBUTE | | SENDING CC | INFORMATION ATTRIBUTE | RECEIVING CC | INFORMATION ATTRIBUTE | DATA STORAGE AREA | RECEIVING CC | INFORMATION ATTRIBUTE | DATA STORAGE AREA |
| A | | | ••• | | | | IDx | | | | |
| B | CC2 | IDz | ••• | | | | IDx | | | | |
| C | | | ••• | | | CC1 | IDy | DATA 2 | CC2 | IDx | |
| ••• | | | ••• | | | | | | ••• | | |

5610

DISTRIBUTED COMPUTER SYSTEM AND METHOD USING A COMMON TRANSMISSION LINE IN A PLURALITY OF PROCESSORS INTERCONNETED FOR EXECUTING A PROGRAM MODULE UTILIZING ATTRIBUTES

BACKGROUND OF THE INVENTION

1. Field of the Invention

The present invention relates to a distributed computer system connected to a plurality of processors via a network and an information management method therefor and more particularly to an information management method in a distributed computer system in which applications handling different kinds of information such as a control application and information processing application coexist and a system therefor.

2. Description of the Prior Art

As a conventional information sending method between processors or program modules in the processors in a distributed computer system connected to a plurality of processors via a common transmission medium, for example, the art indicated in Japanese Patent Application Laid-Open No. 56-111353 is known. In the art indicated in Japanese Patent Application Laid-Open No. 56-111353, when a processor on the information sending side sends information to the common transmission medium, the processor adds a function code which is called a content code which corresponds to the content of the information and indicates the content thereof to the information and sends the information to the common transmission medium without designating the receiving opposite side. Each of the other processors refers to the content code added to the information sent to the common transmission medium and when the processor judges that it is necessary for the processing thereof, the processor receives the information. By this sending method, each processor in the system can send or receive information without taking account of the system configuration or the statuses of the other processors.

In recent computer systems, for example, computer systems used in fields such as traffic and FA (factory automation), co-existence is required of applications which are executed using information of quite different kinds and different qualities from each other such as the real-time control application and information service application in a computer system. However, in the aforementioned prior art, information sent via the common transmission medium is information of the same kind of application content and no consideration is given to handling of information of quite different kinds and different qualities in a single system. Therefore, when a plurality of kinds of information are sent in a single system by the aforementioned prior art, there is the possibility that information of an attribute flows into a processor which is processing information of another attribute and execution of the processing is crippled. Therefore, to let different kinds of applications coexist in a single computer system and execute processing utilizing respective characteristics, how to manage program modules which are the substance for processing various different kinds of applications in the system and attributes of information which are generated by the different kinds of applications and how to separate those informations from each other or integrate them become a problem.

SUMMARY OF THE INVENTION

An object of the present invention is to eliminate the technical difficulties of the prior art mentioned above and to provide a distributed computer system and an information management method which can classify and manage data in a system for each attribute thereof and autonomously manage sending and receiving data of program modules which are distributed in the system.

To accomplish the above object, the present invention is an information management method in a distributed computer system which has a plurality of processors including program modules and a common transmission medium for connecting between the plurality of processors and can send information via the common transmission medium and a system therefor, wherein the first processor recognizes the quality of information which is sent from the program module in the first processor to the common transmission medium among the predetermined plurality of kinds, adds the information attribute identifier corresponding to the recognized quality to the aforementioned information to be sent, and sends it to the common transmission medium and the second processor decides whether the information sent to the common transmission medium is information which can be received by the program module in the self-processor or not, reads the information selectively from the common transmission medium on the basis of the decision result, decides whether the received information is information which can be received by the program module in the self-processor or not on the basis of the aforementioned information attribute identifier added to the read information, when the decision result shows that it is receivable, supplies the received information to the program module, and when the decision result shows that it is not receivable, abolishes the received information. It is more desirable that for judgment of receivable or not, a content code which is added to data sent from the common transmission medium and corresponds to the content thereof is used.

By doing this, the present invention has the function and operation as indicated below.

The present invention having the aforementioned constitution can recognize the quality of data sent from the common transmission medium by the information attribute identifier added to the data and the flow of information in the distributed computer system can be managed autonomously by the processor on the receiving side which attempts to use the information for each attribute thereof. Therefore, information of an attribute can be prevented from flowing into the group of information having another specific attribute or information of a plurality of attributes can be integrated into one. As a result, the attribute of information among applications handling different qualities of information can be protected and processing which is cooperated among the applications can be realized easily.

When a communication protocol using a content code is used so as to judge whether or not to read data flowing on the common transmission medium, the processing executed by each processor can be made flexible and a more remarkable effect can be expected.

The foregoing and other objects, advantages manner of operation and novel features of the present invention will be understood from the following detailed description when read in connection with the accompanying drawings.

BRIEF DESCRIPTION OF THE DRAWINGS

FIG. 9 is a configuration diagram showing another configuration example of the management table.

DETAILED DESCRIPTION OF THE PREFERRED EMBODIMENTS

Next, an embodiment of the present invention will be explained in detail with reference to the accompanying drawings.

Figure 1:
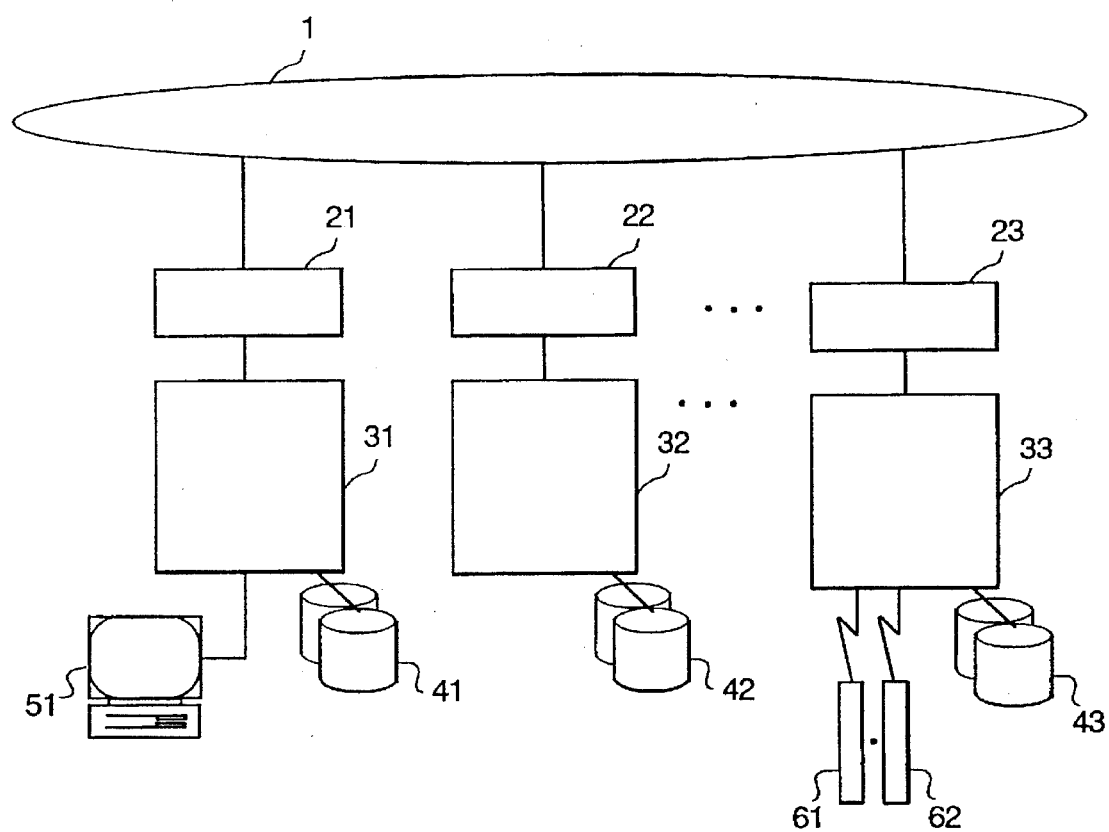
FIG. 1 is a block diagram showing the constitution of the distributed computer system of the first embodiment of the present invention.

FIG. 1 is a block diagram showing the whole constitution of the distributed computer system of this embodiment. In FIG. 1, numerals 31, 32, and 33 indicate processors which distribute and execute various applications to be carried out in the system. Numeral 1 indicates a common transmission medium for connecting the processors 31, 32, and 33 and transferring information among them. Numerals 21, 22, and 23 indicate transmission controllers which are installed between the common transmission medium 1 and the processors 31, 32, and 33 and control data transfer among the processors. In this embodiment, the transmission controllers 21, 22, and 23 are installed independently of the processors 31, 32, and 33. However, they may be incorporated into the processors. Numerals 41, 42, and 43 indicate storages which are connected to the processors 31, 32, and 33 respectively and store data and programs which are necessary for processing by each processor. For the storages 41, 42, and 43, storage media such as external storages such as disk units or internal storages such as memories are used. Numeral 51 indicates a terminal unit which is connected to the processor 31 so as to input an instruction from an operator and display processing result data. Numeral 61 indicates an I/O unit which is connected to the processor 33 so as to input an event signal from the outside such as a sensor and output a control signal to the controller.

In the distributed computer system in this embodiment, a plurality of application programs executed by the processors 31, 32, and 33 cooperated with each other and are processed by transferring data of different kinds of information coexisting in the system via the Common transmission medium 1. A different kind of information indicates information in which the information amount, generation frequency, processing way by each processor, and use way by a system user are different. For example, individual information used in an (OA) application may include both voice and image information and the amount of each information is larger than that of information of other kinds. Such individual information is generated when a user requires the information or when he creates it and the generating way is not definite. However, for such individual information, a peak that users use it simultaneously due to an event from the outside occurs often. The processing of such information requires the certainty (reliability) first instead of the performance in real-time and the processing time at a time may often be comparatively long. Reprocessing by reinput by a user is possible. On the other hand, for example, as to control plant information to be used in an application for executing control processing for a plant, individual information is a comparatively small amount of information which is obtained by a sensor or others. However, such information is often information which is generated periodically and frequently. For control plant information, processing for guaranteeing the performance in real-time which depends on the control plant characteristic is required first. This kind of information is required to be processed frequently and at high speed though the amount of one processing is small. When this kind of information is lost, it is often difficult to reinput it.

In the distributed computer system shown in FIG. 1, for example, information stored in the storage 41, 42, or 43 is searched using the terminal 51 and OA application processing such as processing (electronic data processing (EDP) processing) which is executed for the information by one of the processors 31, 32, and 33 or processing for storing new information in the storage 41, 42, or 43 from the terminal is executed. In parallel with it, data at every moment which is obtained from the I/O unit 61 is stored in the storage 41, 42, or 43 and the plant control processing for calculating the control signal for the plant by the processor on the basis of the data is executed. Different qualities of information as mentioned above which are necessary for executing the aforementioned processing are sent or received among the processors 31, 32, and 33 via the common transmission medium 1. The sent and received information is managed for each kind of information using a method which will be described later and transferred to the processor which requires the information or the program module (not shown in the drawing) which is executed in the processor.

Figure 2:
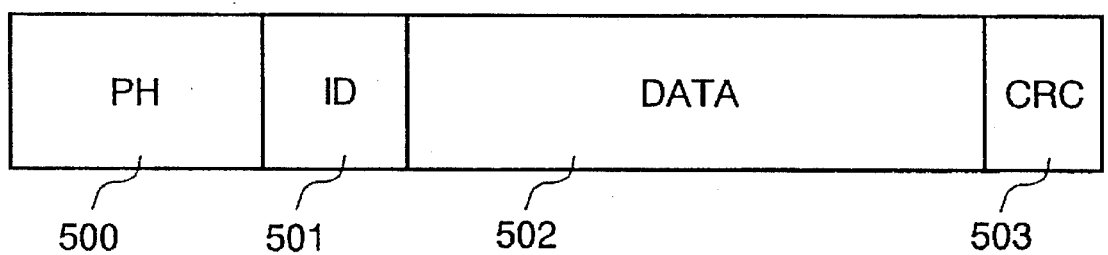
FIG. 2 is a format diagram showing an example of a message transferred between processors.

FIG. 2 is a format diagram of a message which is transferred among the processors 31, 32, and 33 via the common transmission medium 1 in this embodiment. Numeral 500 indicates an area which is generally called a protocol header (PH) and in which control information and management information which are necessary for transfer of a message via the common transmission medium 1 are described. Numeral 502 indicates data which is the substance of the information which is transferred by the corresponding message. Numeral 503 indicates control information (CRC) which is used to check a transfer error and generally called a trailer. Numeral 501 indicates an information attribute identifier (ID) which is newly installed in this embodiment and represents the kind (quality) of the data 502. For the information attribute identifier 501, as explained above using an example, for example, a code which is decided according to the quality such as the generation frequency, amount of information, importance, and use way of the data 502 is used. The code to be used as the information attribute identifier 501 may be decided before data transfer is started or may be decided every time by monitoring data flowing on the common transmission medium 1. This code is added by the management program which will be described later when data is generated.

Figure 3:
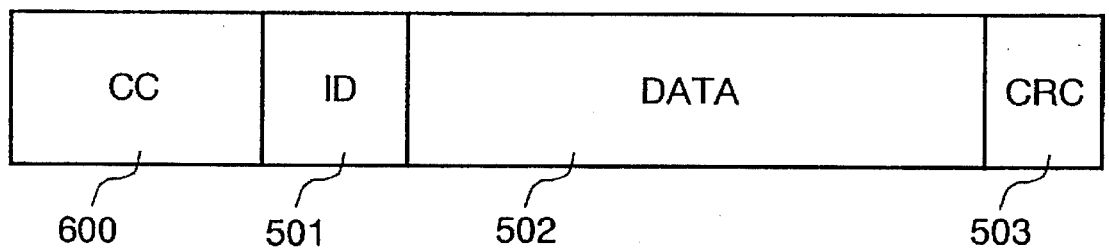
FIG. 3 is a format diagram showing another example of a message transferred between processors.

FIG. 3 shows another example of the message format and as the protocol header 500 of the message format shown in FIG. 2, a content code (CC) 600 which indicates the content of the data 502 is used. The content code 600 indicates the content of the data 502 but not the quality (attribute) of data. Therefore, another message having a different content code 600 may have the same information attribute identifier 501.

Figure 4:
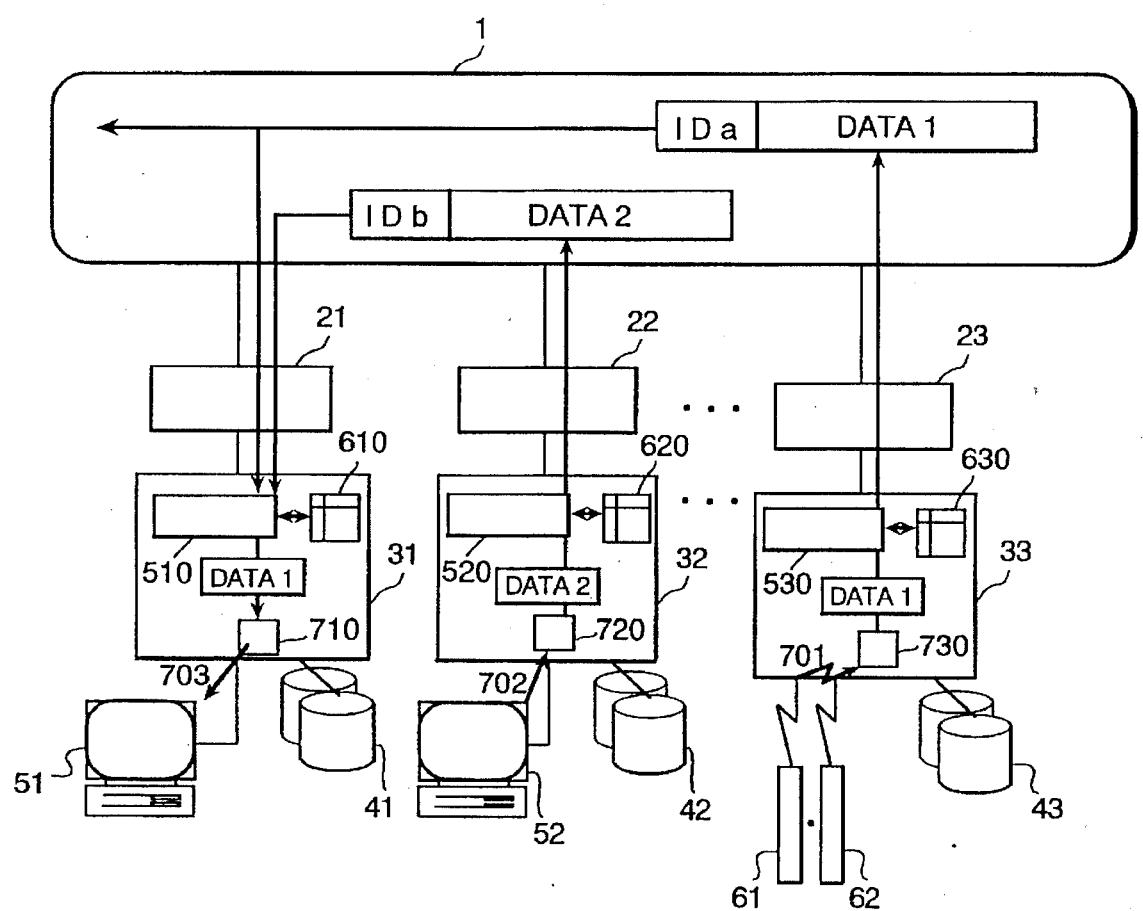
FIG. 4 is a system flow chart showing an example of data transfer between program modules in the first embodiment.

FIG. 4 is a system flow chart showing an example of the status of data transfer between the program modules which are executed by the processors 31, 32, and 33 in this embodiment. In FIG. 4, numerals 510, 520, and 530 indicate management programs for managing different kinds of information which are transferred by the processors 31, 32, and 33 via the common transmission medium 1. Numerals 610, 620, and 630 indicate management tables in which data necessary for executing information management by the management programs 510, 520, and 530 is stored. Numerals 710, 720, and 730 indicate program modules (application program modules) which are executed by the processors 31, 32, and 33 respectively. The management programs 510, 520, and 530 send data which are the processing results of the program modules 710, 720, and 730 to the common transmission medium 1, receive data from the common transmission medium 1, start the program modules according to the quality of the received data, or send the received data to the program modules respectively by the method which will be described later. In FIG. 4, the same reference number as that shown in FIG. 1 is assigned to each component which is common to FIG. 1. The protocol header and trailer of a message flowing through the common transmission medium 1 are omitted in the drawing.

The program module 730 receives a data signal 701 which is sent from the I/O units 61 and 62 every moment and executes real-time processing according to the data signal 701. Data (data1) which is outputted as a processing result of the program module 730 is generated in real time and cyclically. The management program 530 refers to the management table 630, adds an information attribute identifier "IDa" indicating that it is data of a real-time and cyclic quality to "data1" which is the processing result outputted from the program module 730, and transfers it to the transmission controller 23. The program module 720 receives data 702 which is inputted by the operator via a terminal unit 52 and executes interactive processing on the basis of it. Data (data2) which is outputted as a processing result of the program module 720 is generated intermittently on-demand. The management program 520 receives "data2" which is the processing result of the program module 720, refers to the management table 620, adds an information attribute identifier "IDb" indicating that it is data of an on-demand and intermittent quality to "data2", and transfers it to the transmission controller 22. The transmission controllers 22 and 23 send data received from the processors 32 and 33 to the common transmission medium 1.

The program module 710 in the processor 31 receives data flowing on the common transmission medium 1, monitors the system status, and outputs an error occurrence or others to the terminal unit 51 so as to inform the operator of it. The management program 510 abolishes data among the received data other than the message which is judged to be received by the processor 31 from the information attribute identifier and transfers messages among the other messages which are required by the program module in the processor 31 to the program module. The judgment as to whether or not to receive data on the basis of the information attribute identifier is made with reference to the management table 610. In the management table 610, information indicating that data which is added with "IDa" as an information attribute identifier is to be transferred to the program module 710 and data which is added with "IDb" is not to be transferred to the program module 710 is stored. Therefore, in this embodiment, the data "data1" which is sent to the common transmission medium 1 from the processor 33 is transferred to the program module 710 by the management program 510 and the data "data2" which is sent from the processor 32 is transferred to the program module 710.

By the aforementioned processing, it can be prevented that data which is inputted by mistake into the terminal unit 52 connected to the processor 32 by an operator is outputted to the terminal unit 51 which is a watching monitor or the real-time property of processing by the program module 710 is lost.

Figure 5:
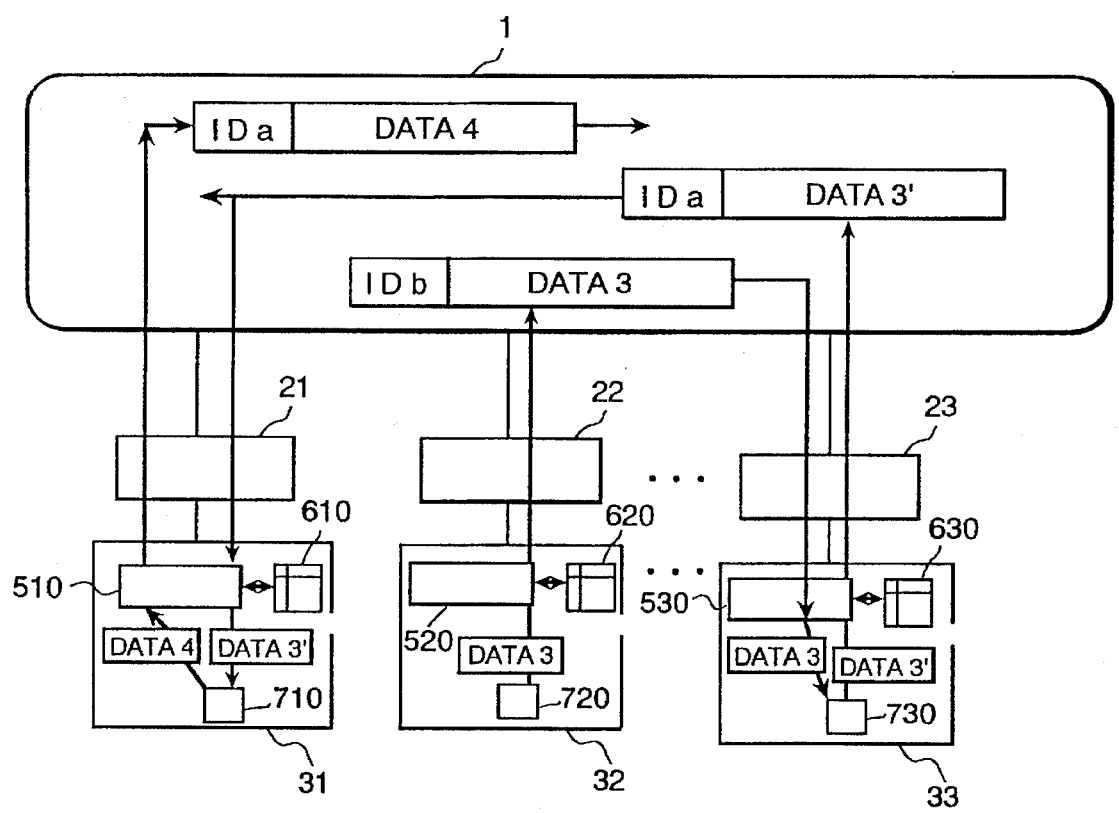
FIG. 5 is a system flow chart showing another example of data transfer between program modules in the first embodiment.

FIG. 5 is a system flow chart showing another example of data transfer between the program modules in this embodiment. In FIG. 5, the program module 730 receives a message including "data3" sent from the program module 720 and executes processing on the basis of the received "data3". Data of "data3'" which is generated as a result of processing is sent from the program module 730 and received by the program module 710. The program module 710 processes "data3'", outputs "data4" as a result thereof, and sends it to the common transmission medium 1. The information attribute identifier of the information which can be received by the program module 730 is different from the information attribute identifier of the information to be sent. In FIG. 5, information attribute identifiers "IDa" and "IDb" which are added to a message on the common transmission medium 1 have the same meanings as those shown in FIG. 4.

Figure 6:
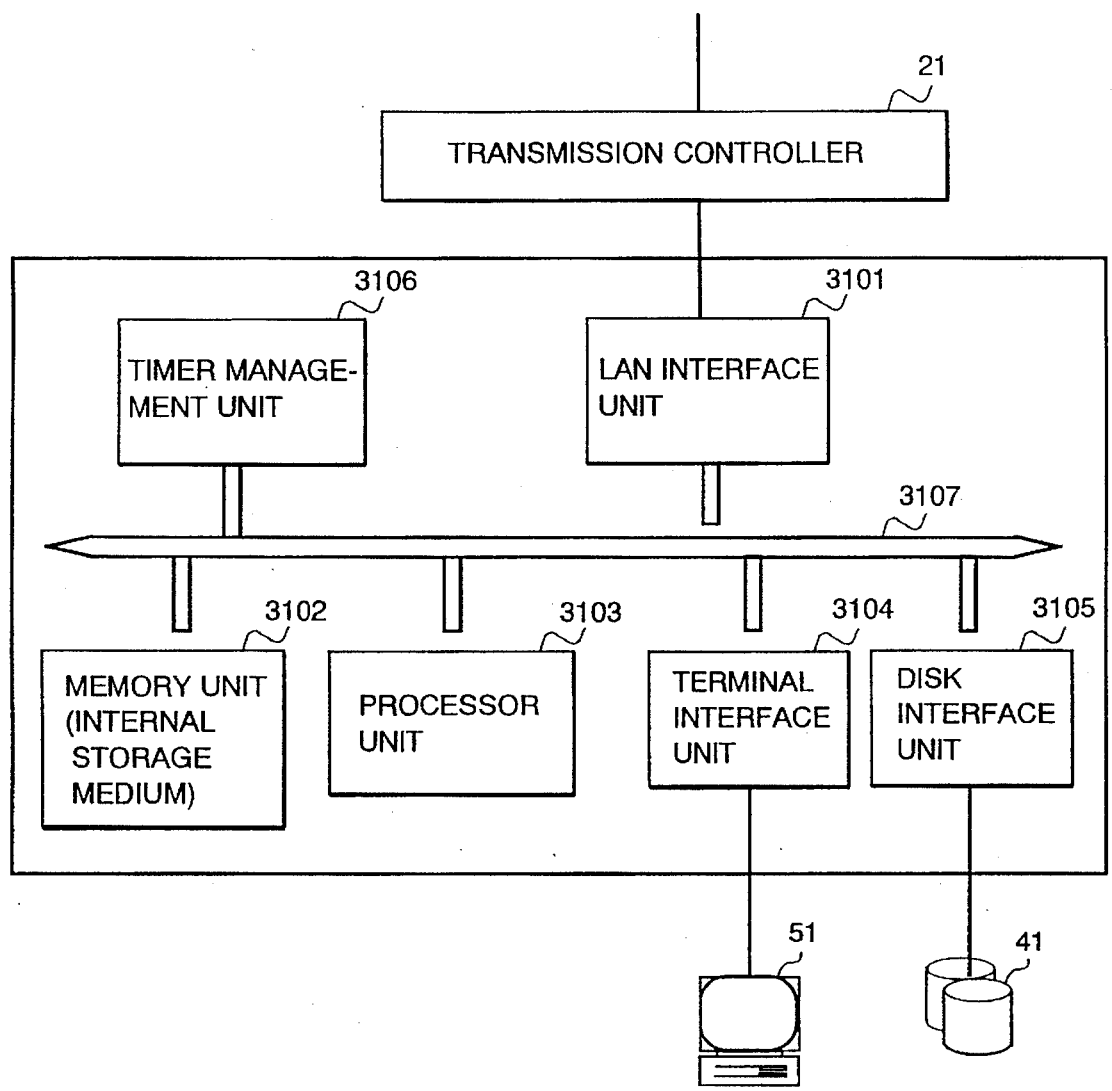
FIG. 6 is a block diagram showing the hardware configuration in a processor.

FIG. 6 is a block diagram showing the hardware configuration in the processor 31 in this embodiment. In FIG. 6, numeral 3101 indicates a LAN interface unit for controlling signal transfer between the processor 31 and the transmission controller 21, 3102 a memory unit for storing various programs such as the management programs and application programs, data, and information of the management tables, 3103 a processor unit for executing various processes according to various programs stored in the memory unit 3102, 3104 a terminal interface unit which is connected to the terminal unit 51 and receives data inputted from the terminal unit or outputs data to the terminal unit 51, 3105 a disk interface unit for controlling data transfer between the processor 31 and the external storage 41 such as a disk unit, and 3106 a timer management unit for managing the internal clock (timer). These units are connected to each other via a bus 3107 in the processor 31. In FIG. 6, the processor 31 is shown as an example. However, almost the same constitution is available for the other processors.

Figure 7:
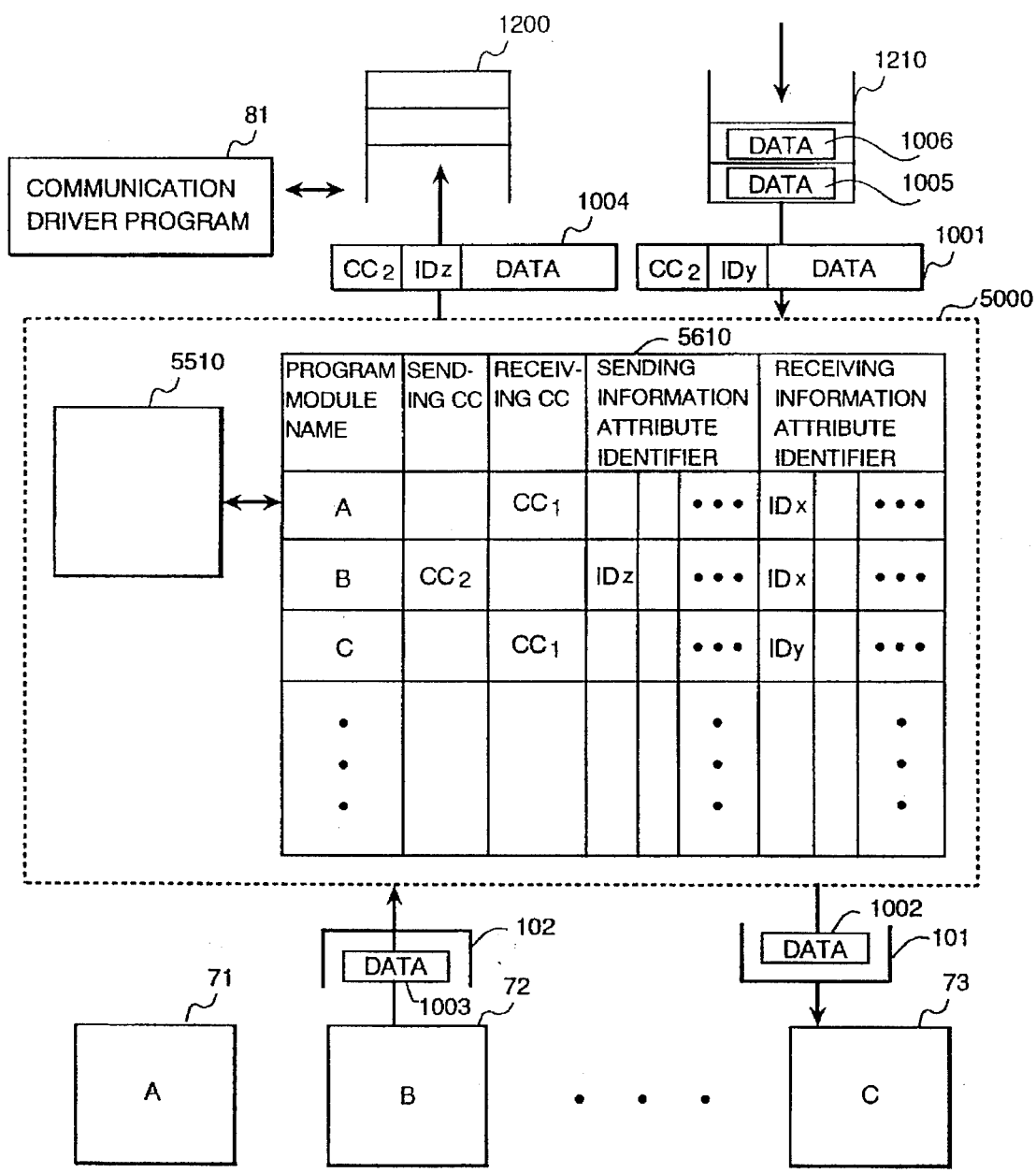
FIG. 7 is a block diagram showing the flow of information between the management program and program module.

FIG. 7 is a block diagram showing flow of information between the management program and program modules. In FIG. 7, numerals 71, 72, and 73 indicate program modules, 5510 a management program, and 81 a communication driver program for sending data to the common transmission medium and reading data from the common transmission medium. Numeral 102 indicates a buffer for temporarily holding output data 1003 from the program module and 101 indicates a buffer for temporarily holding data which is to be transferred from the management program 5510 to the program module. Numeral 1200 indicates a sending buffer for holding data to be sent to the common transmission line and 1210 indicates a receiving buffer for holding data which is read from the common transmission medium. Numeral 5610 indicates a management table in which information indicating whether or not to transfer the data held in the receiving buffer 1210 to the program module is stored. In FIG. 7, the section consisting of the management program 5510 and the management table 5610 is shown as a management module 5000. The management module 5000 and the program modules 71 to 73 are stored in an external storage such as explained in FIG. 6. When the processor is started or when the program is executed, they are loaded into the memory unit in the processor from the external storage.

The management table 5610 has an entry corresponding to each program module. In the entry corresponding to each program module, a sending content code (sending CC) to be added to data outputted from the corresponding program module, a content code of receiving data (receiving CC) which is required by the program module mentioned above, a sending information attribute identifier to be added to sending data, and a receiving information attribute identifier which may be received are registered. In the entry of receiving information attribute identifier, an information attribute identifier which is not permitted to be received may be registered in place of registering an information attribute identifier which is permitted to be received. If this occurs, data which is added with an information attribute identifier other than those registered in the entry of receiving information attribute identifier is transferred to the program module.

Figure 8:
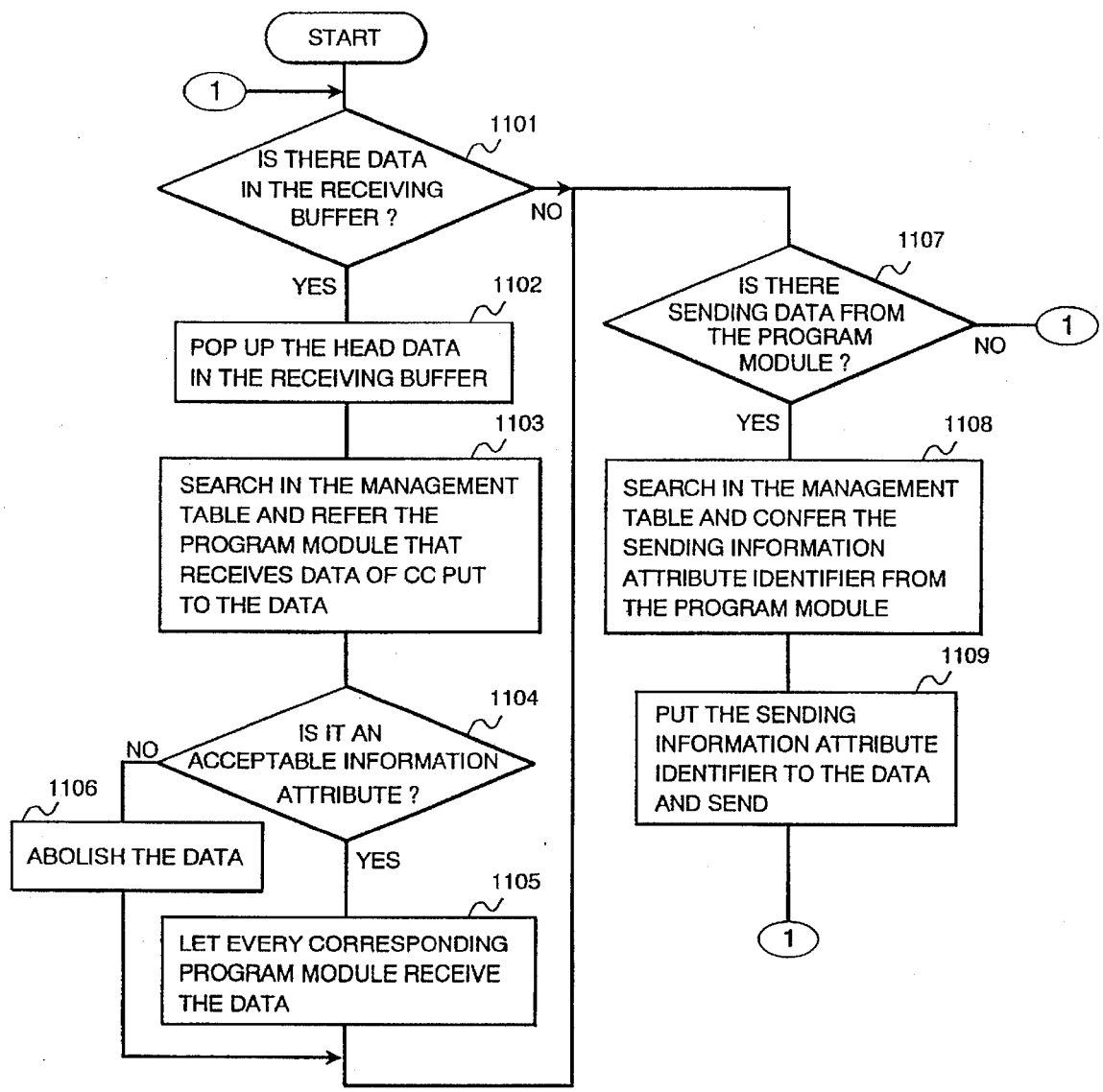
FIG. 8 is a flow chart showing the processing procedure executed by the management program.

FIG. 8 is a processing flow chart showing the flow of processing by the management program 5510. Next, the processing executed by the management program 5510 will be explained with reference to FIGS. 7 and 8. When the management program 5510 is activated and starts processing once, it monitors whether data is outputted from the sending buffer 1200, the receiving buffer 1210, and the program modules 71, 72, and 73 in the self-processor or not. When the processor is started or receiving information is received from the communication driver program, the management program 5510 is activated first and operates continuously.

The management program 5510 watches the receiving buffer 1210 first and checks whether there is a received message which is read from the common transmission medium in it (Step 1101). When the message is stored in the receiving buffer 1210, the management program 5510 pops up the message from the top position in the receiving buffer 1210 (Step 1102), searches in the receiving CC area of the management table 5610, and specifies the program module having a receiving CC which coincides with the content code which is added to the received message (Step 1103). In the example shown in FIG. 7, a content code "CC1" is added to a received message 1001 and as a program module which requires this message, a program module "A" 71 and a program module "C" 73 are specified.

Next, the management program 5510 compares the information attribute identifier added to the message and the receiving information attribute identifier in the management table with regard to the specified application program module and checks whether they coincide with each other (Step 1104). When the two coincide with each other, the management program 5510 judges that the receiving message may be received by the program module, transfers the data section of the message to the corresponding program module, and goes to the processing at Step 1107 (Step 1105). When the two do not coincide with each other, the management program 5510 abolishes the data and goes to Step 1107 (Step 1106). In the example shown in FIG. 7, the information attribute identifier "IDy" added to the message coincides with the receiving information attribute identifier of the program module "C" in the management table 5610 but does not coincide with the receiving information attribute identifier of the program module "A", so that data 1002 of the message 1001 is transferred only to the program module "C".

When there is no message in the receiving buffer 1210 or when the processing for the receiving message ends, the management program 5510 checks whether there is sending data from the program module which is managed by the management table 5610 in the intermediate buffer 102 or not. When there is no sending data in every intermediate buffer 102, the management program 5510 returns to Step 1101 (Step 1107). When there is data in the intermediate buffer 102, the management program 5510 searches in the management table 5610, finds out the sending information attribute identifier and content code from the entry corresponding to the program module which outputs the data (Step 1108), forms a sending message by adding them to the data, and stores it in the sending buffer 1200 (Step 1109). For example, in the example shown in FIG. 7, there is output data 1003 of the program module "B" in the intermediate buffer 102, and a content code "CC2" and an information attribute identifier "IDz" are added to this data, and a sending message 1004 is formed. When the processing for the sending data ends as mentioned above, the management program 5510 returns to Step 1101 and executes the processing continuously.

In the embodiment explained above, it is assumed that the number of data which is outputted from each program module and the number of data which is required by each program module are 1 respectively. However, the number of data which is outputted from each program module and the number of data which is required by each program module may be more than one respectively. In this case, in the management table 5610, a sending management area and a receiving management area in which a content code and an information attribute identifier in correspondence with data to be outputted or data to be required are provided as shown in FIG. 9. When a plurality of information attributes (quality of data) are permitted for data to which the same content code is added, a sending or receiving management area is provided according to the plurality of information attributes. The data storage area shown in FIG. 9 is used to store data which is popped up from the receiving buffer once and to wait and transfer necessary data to the program module when the program module is activated at the point of time when the data which is required by the program module is all gathered.

In the embodiment explained above, it is possible to promote the processing by dynamically changing the information attribute identifier of data to be sent or received. In this case, an area (called an information attribute management area) where an information attribute identifier is set or change by the management program according to the status every moment is provided in the management table. For example, the management program monitors the data length of data stored in the data storage area or the generation frequency of data and sets the corresponding information attribute identifier. The generation frequency may be decided by monitoring the data sending and receiving interval using the internal clock.

Figure 10:
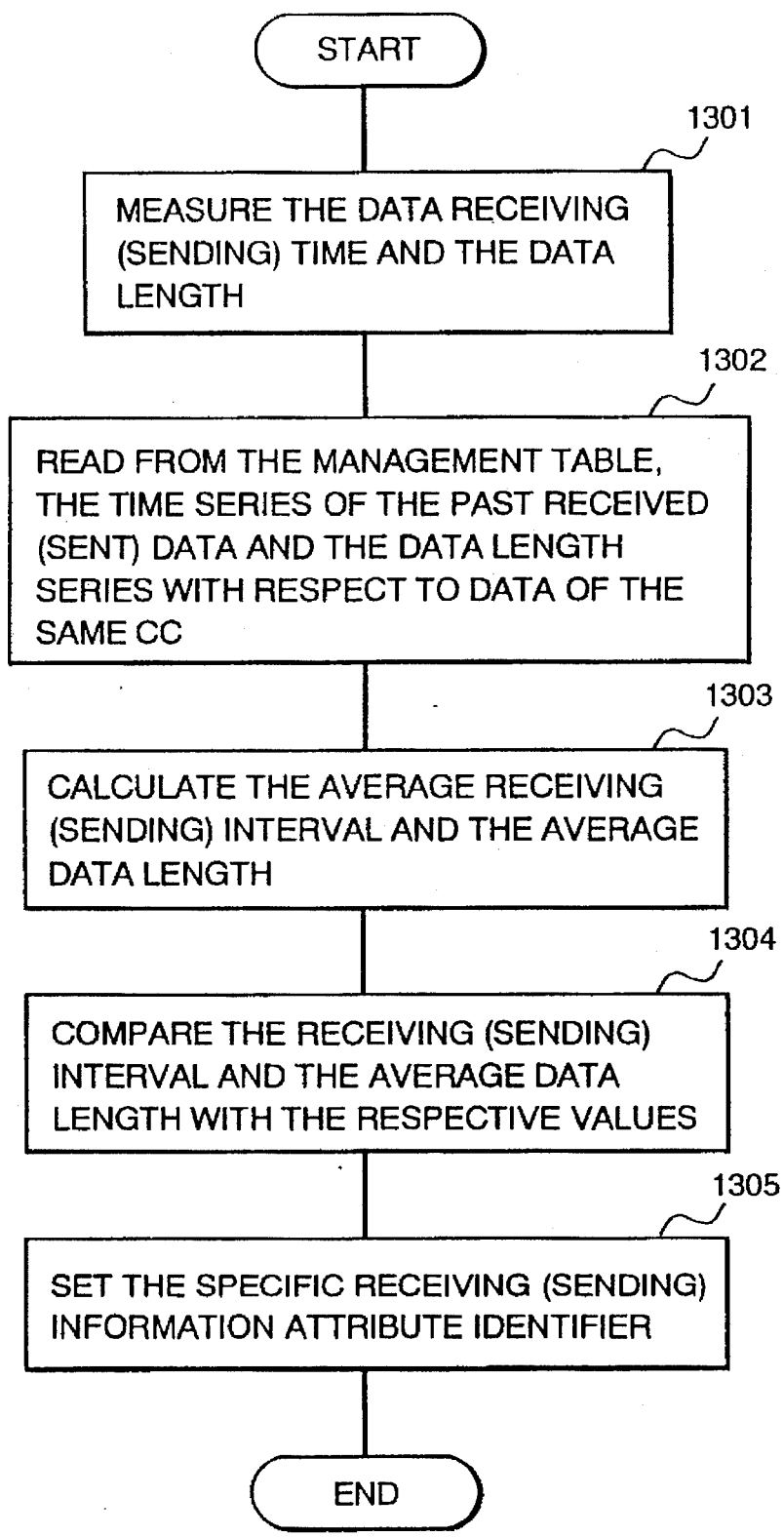
FIG. 10 is a flow chart showing the processing procedure for dynamically setting an information attribute identifier.

FIG. 10 is a flow chart showing an example of setting processing of an information attribute identifier. To dynamically set an information attribute identifier, the management program executes changing of the receiving information attribute identifier and changing of the sending information attribute identifier according to the processing procedure indicated below between Step 1102 and Step 1103 shown in FIG. 8 and between Step 1107 and Step 1108 respectively. In FIG. 10 and the following explanation, setting of a receiving information attribute identifier will be explained mainly and the explanation of a sending information attribute identifier will be indicated in parentheses.

Firstly, the management program measures the receiving time (sending time) of data which is fetched from the receiving buffer (the intermediate buffer when a sending information attribute identifier is set) and the data length (Step 1301). Next, the management program refers to the respective values of the past corresponding received data (sent data) which are stored in the management table (Step 1302) and calculates the average receiving (sending) time interval and the average data length (Step 1303). The management program compares these calculated average values and the predetermined values which are given for them beforehand (Step 1304), decides the kind of information attribute identifier of the data on the basis of the comparison result, and sets it in the management table (Step 1305).

In the information attribute identifier setting method shown in FIG. 10, the average data generation frequency and data length are taken account of. According to this method, for example, the real-time control program module may be dynamically provided with a device for receiving only data of a short data length and a high generation frequency and abolishing data of another quality. By doing this, the real-time property of the program module can be prevented from damage even at the time of system expansion or maintenance. In this embodiment, only average calculations of the generation frequency and data length are indicated. However, other methods on the basis of the property of application of the object system such as a method for measuring the behavior of data generation for many hours and setting the information attribute identifier from the variation pattern thereof may be used.

Figure 11:
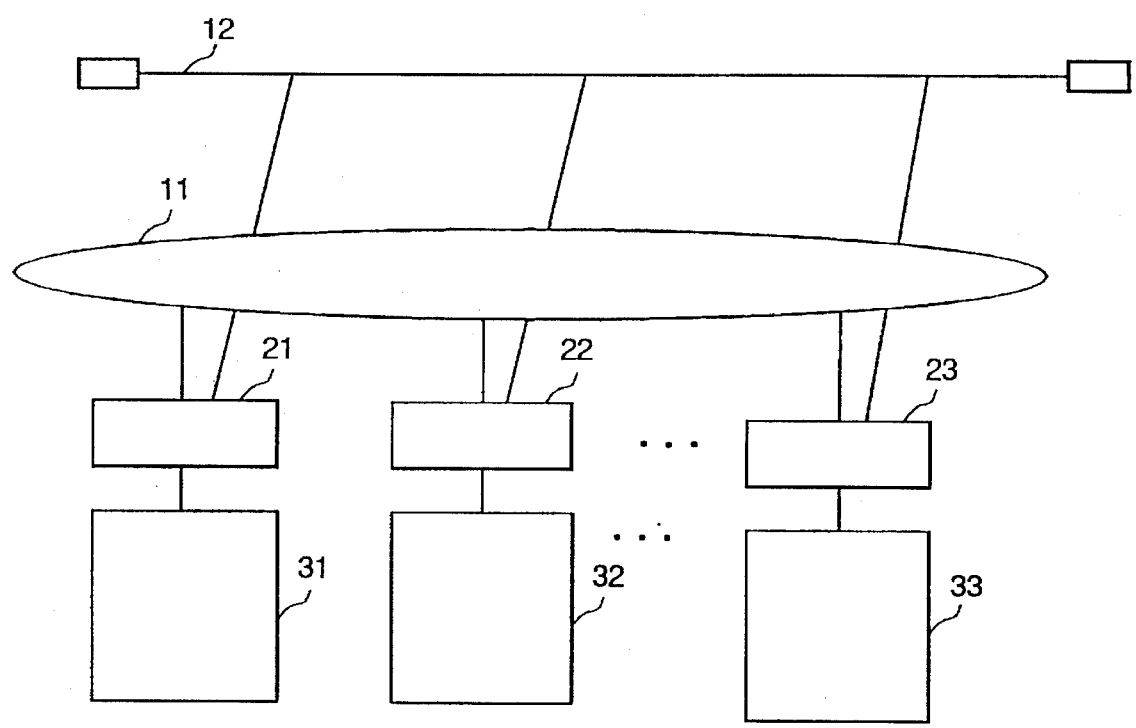
FIG. 11 is a block diagram showing the constitution of the distributed computer system of the second embodiment of the present invention.

FIG. 11 is a system block diagram of another embodiment of the present invention. This embodiment is different from the embodiment shown in FIG. 1 in that the processors 31, 32, and 33 are connected to each other via a plurality of common transmission media 11 and 12. In this embodiment, the common transmission medium to be used to transfer information among the processors is distinguished for each quality of the information. By doing this, for example, it can be prevented that the transfer of information for which the real-time property is required is disturbed by transmission in the state that information of another quality coexists due to a restriction on the transmission capacity of a transmission medium. Two or more common transmission media may be used and a transmission controller may be installed for each transmission medium.

Figure 12:
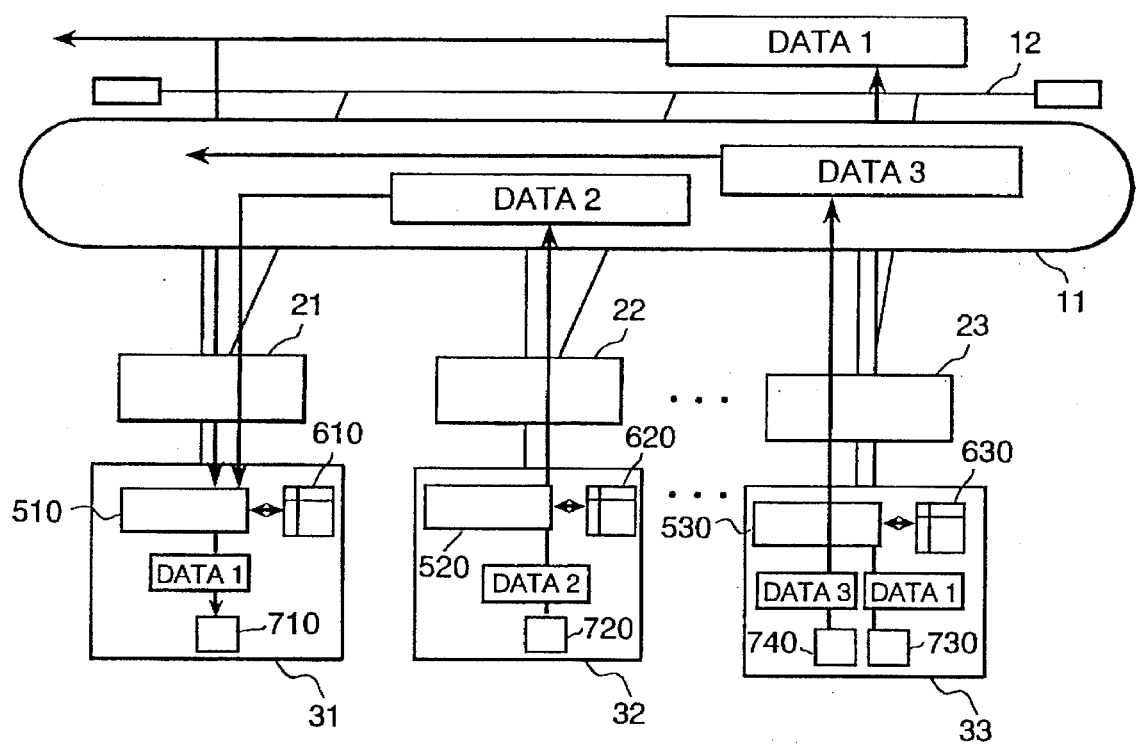
FIG. 12 is a system flow chart showing an example of data transfer between program modules in the second embodiment.

FIG. 12 is a system flow chart showing the flow of data in this embodiment. In FIG. 12, "data1" is data which is generated in real time and cyclically and used to transfer data of such a quality by the common transmission medium 12. "Data2" and "data3" are data which are generated intermittently on-demand and used to transfer data of such a quality by the common transmission medium 11. The constitution of each processor and the flow of information between the program modules and the management programs are almost the same as those in the previous embodiment, though it is different from the previous embodiment that a plurality of sending buffers and receiving buffers are provided in correspondence with the transmission media. In FIG. 12, the management program 520 in the processor 32 refers to the management table 620 and stores "data2" outputted by the program module 720 in the sending buffer corresponding to the common transmission medium 11 and the transmission controller 22 sends "data2" fetched from the sending buffer to the common transmission medium 11. The management program 530 in the processor 33 also stores "data3" which is output data of the program module 740 in the sending buffer corresponding to the common transmission medium 11. The management module 530 recognizes that data outputted from another program module 730 in the processor 33 has performance in real time and is cyclic by viewing the management table 630 and stores "data1" in the sending buffer corresponding to the common transmission medium 12. The transmission controller 23 sends "data3" which is stored in the sending buffer corresponding to the common transmission medium 11 to the common transmission medium 12 and sends "data11" which is stored in the sending buffer corresponding to the common transmission medium 12 to the common transmission medium 12. In this embodiment, no information attribute identifier may be added to a message in the same way as with the embodiment explained previously. Without distinguishing the common transmission medium to which data is to be sent depending on the buffer, when a message is transferred to the transmission controller from the processor, the common transmission medium to which the message is to be sent from the processor may be designated. On the other hand, when the management program in the processor 31 reads these data, the management program recognizes the common transmission medium from which the data is read and judges the quality of the data.

Therefore, the transmission controller 21 informs the processor 31 of the read message and the common transmission medium from which the message is received. The management program 510 of the processor 31 refers to the management table 610 and judges whether or not to transfer the data to the program module on the basis of the quality of the read data. In FIG. 12, only the data on the common transmission medium 12 is transferred to the program module 710 and data which is sent via the common transmission medium 11 is not transferred to the program module 710. When a transmission controller is installed for each common transmission medium so as to discriminate the quality of received data in the processor and the transmission controller from which the data is transferred is recognized, the common transmission medium from which the data is received can be judged.

In this embodiment, processing executed by the management program is executed in the same way as with the previous embodiment except a part of the processing. In this embodiment, at Step 1109 shown in FIG. 8, sent data is stored in the sending buffer for the common transmission medium corresponding to the sending information attribute identifier which is obtained as Step 1108 and data is sent to the common transmission medium corresponding to the sending information attribute identifier.

Figure 13:
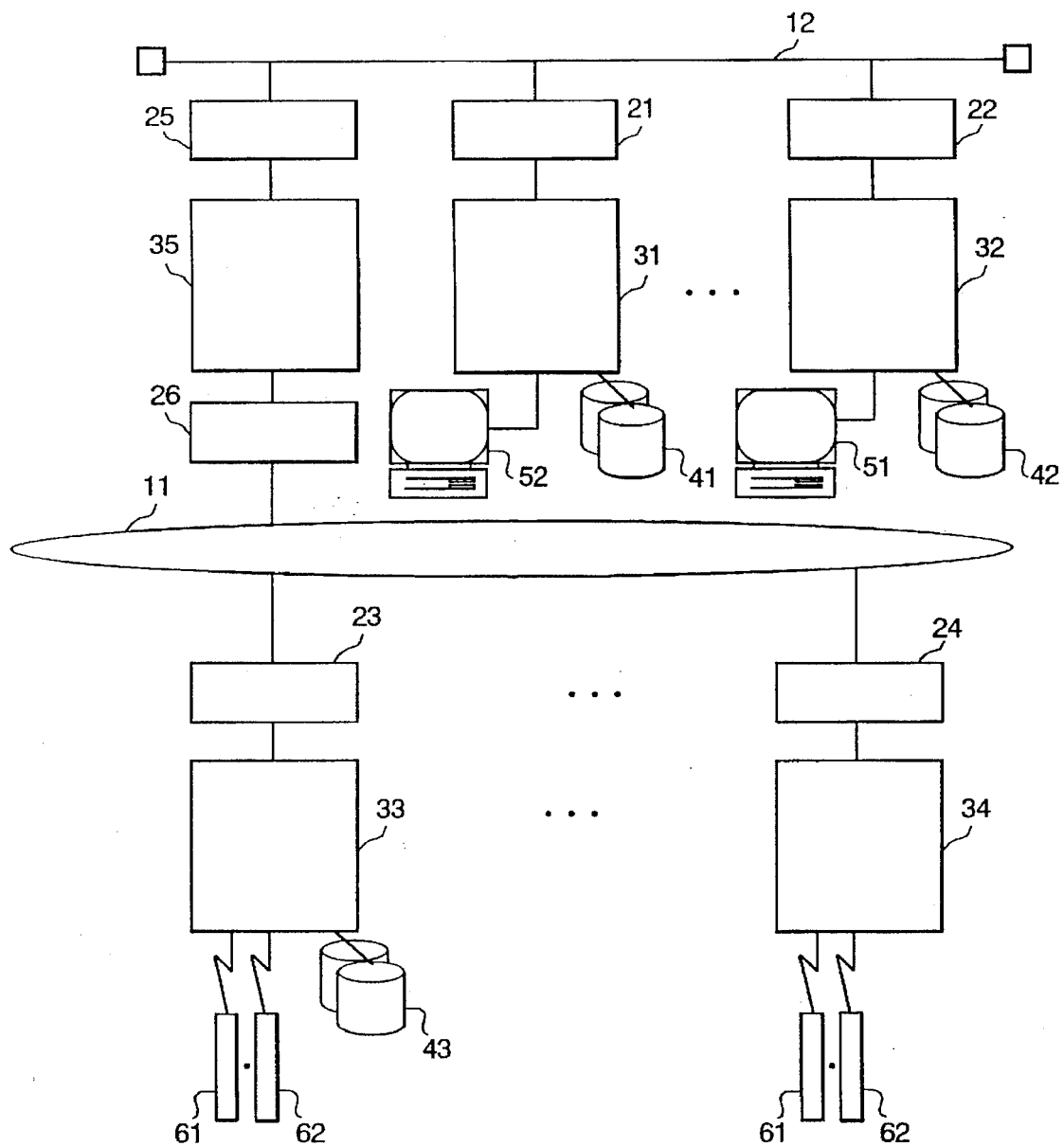
FIG. 13 is a block diagram showing the constitution of the distributed computer system of the second embodiment of the present invention.

FIG. 13 is a system block diagram of still another embodiment of the present invention. In this embodiment, in the same way as with the system shown in FIG. 11, data is transferred using a different common transmission medium depending on the quality of data to be sent. In FIG. 13, the processors 31 and 32 are, for example, processors for mainly executing interactive processing via a person using the terminal units 51 and 52 and for handling only data which is intermittently on-demand. The processors 33 and 34 are processors for mainly executing real-time processing using a sensor 61 and a controller 62. On the other hand, in this embodiment, the processor 35 is connected to the two common transmission media 11 and 12 via the transmission controllers 25 and 26 and only the processor 35 can execute processing in relation to both processing executed by the processors 31 and 32 and processing executed by the processors 33 and 34. In this embodiment, between the processors 33 and 34 which are connected only to the common transmission medium 11 and the processors 31 and 32 which are connected only to the common transmission medium 12, data is transferred via the processor 35.

The constitution of this embodiment as mentioned above can be applied to a case that each of a series of plurality of processes which are executed in the system often uses only information mainly having a quality and rarely uses information having other qualities.

In the embodiment explained above, a content code is used as a communication protocol between the processors. However, instead of a protocol using a content code, for example, another communication protocol such as to designate the destination of each processor and send a message by the one-to-one communication method may be used so as to realize the present invention in the same way. However, by using a content code as a communication protocol, there is no need for the sending side to take account of the opposite side which receives a message, and the handling of the message received from the common transmission medium can be left to the judgment of the receiving side, and a flexible system can be configured. How to reflect the quality of information to the processing by each processor cannot be decided uniformly in a system and it varies with an individual processor or an individual application module. Therefore, by applying a protocol using a content code to the present invention, the judgment as mentioned above can be executed flexibly and autonomously by the receiving side so as to improve the effect more remarkably.

According to the present invention, when there are different kinds of applications in a distributed system or there are different kinds of informations which are handled by the different kinds of applications, those applications and informations can be managed for each attribute thereof. By doing this, when there is a possibility that informations of different attributes coexist in a system and execution of an application on the basis of information of an attribute is adversely affected by informations of other attributes, it is easily possible to separate those informations and to execute the application by synchronizing informations of related attributes with each other.

What is claimed is:

1. A distributed computer system having a plurality of processors and a common transmission medium connecting said plurality of processors, which can send information between said processors via said common transmission medium, comprising: processors, each of said processors including, a program module for executing a predetermined processing;

means for sending a quality of information outputted by said program module as one of a predetermined plurality of kinds of qualities, to said common transmission medium by adding a discriminative information as said quality of information including at least one of generation frequency, data length, use of said information, and property of application of the distributed computer system;

means for selecting and reading information which can be received by said program module in the second processor from said common transmission medium, based upon said discriminative information;

means for discriminating the quality of the read information on the basis of said discriminative information;

means for deciding whether or not to supply the received information to the program module in the second processor on the basis of the result of the discrimination made by the discrimination means; and means for supplying said received information to said program module when the result of the decision made by the decision means is to supply.

2. A distributed computer system according to claim 1, wherein the sending means further comprises:

means in said sending means for discriminating the quality of information which is outputted by said program module; and means for sending said information by adding the information attribute identifier corresponding to said discriminative information as said quality of information, according to the result of said discrimination.

3. A distributed computer system according to claim 2, wherein the discrimination means has management information in which said information attribute identifier corresponding to the quality of information which can be supplied to said program module is registered.

4. A distributed computer system according to claim 2, wherein said discrimination means comprises:

management information in which the information attribute identifier corresponding to the quality of information which is not permitted to be supplied to said program module is registered; and means for making said discrimination according to said management information.

5. A distributed computer system according to claim 2 wherein the deciding by the deciding means is performed according to management information in which said information attribute identifier corresponding to a quality of information permitting the information to be received by the program module is registered.

6. A distributed computer system according to claim 2 further comprising:

means for measuring data receiving/sending time and data length, and calculating an average interval time and average data length of an information to be sent from the program module in the first processor;

wherein, said means for recognizing is performed based upon the calculated average interval time and the average data length.

7. A distributed computer system according to claim 2, further comprising:

means for measuring data receiving/sending time and data length, and calculating an average interval time and average data length of an information to be sent from the program module in the first processor;

wherein, said means for recognizing is performed based upon the calculated average interval time and the average data length, and the deciding by the deciding means is performed according to management information in which said information attribute identifier corresponding to a quality of information permitting the information to be received by the program module is registered.

8. A distributed computer system according to claim 1, further comprising:

a plurality of common transmission media for sending information having a quality corresponding to at least one of said qualities of information;

wherein the sending means comprises:

means for discriminating a quality of the outputted information; and means for sending the discriminated information to the common transmission medium which corresponds to said quality of information.

9. A distributed computer system according to claim 1, wherein each said processor is connected to the common transmission medium corresponding to information having a quality which is permitted to be sent or received to from the program module in the second processor.

10. A distributed computer system according to claim 1, wherein the sending means comprises:

means for sending said information to which the content code which is determined beforehand in correspondence with the content of said information is added to said common transmission medium.

11. A distributed computer system according to claim 1, further comprising:

means for transferring information between a first processor which is not connected to a first common transmission medium among said common transmission media and a second processor which is not connected to a second common transmission media among said common transmission media via a third processor which is connected to both of said first and second common transmission media.

12. An information management method in a distributed computer system comprising a plurality of processors including program modules and a common transmission medium for connecting between said plurality of processors and which can send information via said common transmission medium, the method comprising:

a step of recognizing a quality of information to be sent from a program module in a first processor to said common transmission medium among a predetermined plurality of kinds of information including at least one of generation frequency, data length, use of said information, and property of application of the distributed computer system;

a step of adding an information attribute identifier corresponding to the recognized quality of information to be sent and sending it to said common transmission medium;

a first decision step of deciding by a second processor whether said information sent to said common transmission medium is information that can be received by a program module in the second processor;

a step of selectively reading said information from said common transmission medium on the basis of the decision result;

a second decision step of deciding whether said received information is information which is to be received by a program module in the second processor, on the basis of said information attribute identifier attached to the read information;

a step of supplying the received information to said program module when said decision result shows that it is receivable; and a step of abolishing the received information when said decision result shows that it is not receivable.

13. An information management method according to claim 12, wherein said second decision is made by each of said processors according to a management information in which said information attribute identifier corresponding to the quality of information permitting the information to be received by the program module is registered.

14. An information management method in a distributed computer system comprising a plurality of processors including program modules and a common transmission medium for connecting between said plurality of processors and can send information via said common transmission medium, comprising:

a step of measuring data receiving/sending time and data length, and calculating an average interval time and average data length of an information to be sent from a program module in a first processor;

a step of recognizing a quality of said information to be sent from said program module, based upon the calculated average interval time and average data length, said quality being among a predetermined plurality of kinds of information including at least one of generation frequency, data length, use of said information, and property of application of the distributed computer system;

a step of adding an information attribute identifier corresponding to the recognized quality of information to be sent and sending it to said common transmission medium;

a first decision step of deciding by a second processor whether said information sent to said common transmission medium is information that can be received by a program module in the second processor;

a step of selectively reading said information from said common transmission medium on the basis of the decision result;

a second decision step of deciding whether said received information is information which is to be received by the program module in the second processor on the basis of said information attribute identifier attached to the read information, according to a management information in which said information attribute identifier corresponding to the quality of information permitting the information to be received by the program module is registered, based upon an operation status of the receiving processor;

a step of supplying the received information to said program module when said decision result shows that it is receivable; and a step of abolishing the received information when said decision result shows that it is not receivable.

15. An information management method according to claim 14, wherein as said operation status, at least one of a receiving time zone of said information in correspondence with said processor, a loading status of said processor, and an amount of unprocessed received information in said processor is used.

16. An information management method according to claim 12, wherein said step of supplying information supplies a plurality of information to said program module in said second processor which uses a plurality of information having different qualities respectively when said plurality of information are gathered.

17. An information management method according to claim 12, wherein said step of sending to said common transmission medium adds a content code decided beforehand in correspondence with the content of said information to said information to be sent and sends it, and said second decision is made on the basis of said content code.

18. An information management method according to claim 1, wherein said program module includes a first program module which is permitted to receive information having a first quality and is not permitted to receive information having a second quality, a second program module which is permitted to receive information having said second quality and is not permitted to receive information having said first quality, and a third program module which is permitted to receive information having both said first and second qualities, further comprising:

a step of sending information between said first program module and said second program module via said third program module.

19. An information management method according to claim 12, wherein the deciding by said second decision step, is performed according to management information in which said information attribute identifier corresponding to a quality of information permitting the information to be received by the program module is registered.

20. An information management method according to claim 12, further comprising:

a step of measuring data receiving/sending time and data length, and calculating an average interval time and average data length of an information to be sent from the program module in the first processor;

wherein, said step of recognizing is performed based upon the calculated average interval time and the average data length.

21. An information management method according to claim 12, further comprising:

a step of measuring data receiving/sending time and data length, and calculating an average interval time and average data length of an information to be sent from the program module in the first processor;

wherein, said step of recognizing is performed based upon the calculated average interval time and the average data length, and the deciding by said second decision, is performed according management information in which said information attribute identifier corresponding to a quality of information permitting the information to be received by the program module is registered.

* * * * *